US012157247B2

(12) United States Patent
Bartoli

(10) Patent No.: US 12,157,247 B2
(45) Date of Patent: Dec. 3, 2024

(54) MACHINE AND METHOD FOR PUNCHING A BOX-SHAPED ELEMENT OR SUCHLIKE

(71) Applicant: Bartoli Packaging S.r.l., Monsummano Terme (IT)

(72) Inventor: Cinzia Bartoli, Monsummano Terme (IT)

(73) Assignee: BARTOLI PACKAGING S.R.L., Monsummano Terme (IT)

( * ) Notice: Subject to any disclaimer, the term of this patent is extended or adjusted under 35 U.S.C. 154(b) by 26 days.

(21) Appl. No.: 18/023,420

(22) PCT Filed: Aug. 20, 2021

(86) PCT No.: PCT/IT2021/050265
§ 371 (c)(1),
(2) Date: Feb. 27, 2023

(87) PCT Pub. No.: WO2022/044056
PCT Pub. Date: Mar. 3, 2022

(65) Prior Publication Data

US 2023/0311358 A1 Oct. 5, 2023

(30) Foreign Application Priority Data

Aug. 27, 2020 (IT) ........................ 102020000020494

(51) Int. Cl.
*B26F 1/40* (2006.01)
*B26F 1/14* (2006.01)
*B31B 50/86* (2017.01)

(52) U.S. Cl.
CPC ................ *B26F 1/405* (2013.01); *B26F 1/14* (2013.01); *B31B 50/86* (2017.08)

(58) Field of Classification Search
CPC ............. B26F 1/405; B26F 1/14; B31B 50/86
See application file for complete search history.

(56) References Cited

U.S. PATENT DOCUMENTS 4,621,553 A * 11/1986 Gruchalski ............ B21D 28/28 83/194
4,744,276 A * 5/1988 Duce ...................... B21D 28/28 83/179

(Continued)

FOREIGN PATENT DOCUMENTS

CN 109 016 644 A 12/2018
DE 20 2013 101583 U1 7/2014

OTHER PUBLICATIONS

International Search Report and Written Opinion issued Nov. 22, 2021 in PCT/IT2021/050265.

*Primary Examiner* — Omar Flores Sanchez
(74) *Attorney, Agent, or Firm* — Panitch Schwarze Belisario & Nadel LLP

(57) ABSTRACT

Machine for punching a box-shaped element, or suchlike, including at least one punching head provided with at least one punch and translatable in a direction toward or away from a substantially vertical side of the box-shaped element and at least one counter-head that contrasts the punching head, the side of the box-shaped element is positioned during use between the punching head and the counter-head, the counter-head is configured to be inserted inside the box-shaped element and to rest against an internal surface of the side in order to maintain the box-shaped element in position on a work plane, and the punching head is translated toward the counter-head in the direction so as to perforate the side by means of the punch and make at least one through hole therein.

9 Claims, 7 Drawing Sheets

(56) References Cited

U.S. PATENT DOCUMENTS

| | | | | | |
|---|---|---|---|---|---|
| 5,595,101 | A * | 1/1997 | Yoshimatsu | B65H 26/02 | 83/40 |
| 5,624,369 | A * | 4/1997 | Bidlack | B31B 50/00 | 83/681 |
| 2002/0066344 | A1* | 6/2002 | Ewing | B26D 5/12 | 83/52 |
| 2023/0030817 | A1* | 2/2023 | Piper | B26F 1/386 | |
| 2023/0137030 | A1* | 5/2023 | Okada | B26D 7/18 | 83/679 |
| 2023/0321862 | A1* | 10/2023 | Kotaka | B26F 1/02 | |

* cited by examiner

MACHINE AND METHOD FOR PUNCHING A BOX-SHAPED ELEMENT OR SUCHLIKE

CROSS-REFERENCE TO RELATED APPLICATIONS

This application is a Section 371 of International Application No PCT/IT2021/050265, filed Aug. 20, 2021, which was published in the English language on Mar. 3, 2022, under International Publication No. WO 2022/044056 A1, which claims priority under 35 U.S.C. § 119(b) to Italian Application No. 102020000020494, filed Aug. 27, 2020, the disclosures of each of which are incorporated herein by reference.

FIELD OF THE INVENTION

The present invention concerns a machine and a method for punching a box-shaped element or suchlike, for example a box.

The present machine and method concern in particular the production, in a precise and repeatable manner, of at least one through hole on at least one side of a box-shaped element, so as to then be able to insert a gripping element of the box-shaped element into the through hole, such as a strip-shaped element or other.

The through hole made in the box can have any shape and size whatsoever, so it can be a circular hole, an elliptical hole, a slot, a polygonal hole, for example square or rectangular, or other.

BACKGROUND OF THE INVENTION

It is known that there exist different types of box-shaped elements, or boxes, to which it is desirable to apply at least one strip-shaped element in order to make a grip, a handle or other. The strip-shaped element can be, for example, a strip made of flexible material, for example a fabric, such as cotton or suchlike.

A box-shaped element of a known type, which is mentioned here by way of a non-restrictive example, is the so-called wrapped box.

The wrapped box normally consists of a cardboard sheet, or suchlike, of suitable sizes depending on the object or objects that it will have to contain, and a sheet of paper, suitably shaped, which covers the box-shaped element externally and sometimes covers it also internally. When the box-shaped body is covered both on the inside and also on the outside, it is usually referred to as a coupled cardboard box.

To produce a wrapped box, with at least the external covering of the paper sheet, commercial machines are used that, from a cardboard blank, allow to obtain a crude box and then a box with a sheet of paper applied at least on the outside. The last phase of this wrapping can be completed in a so-called covering machine, the purpose of which is to cover the sides of the crude box and tuck the excess paper toward the inside of the box.

If on this box-shaped element, for example the wrapped box, it is necessary or desirable to apply a strip-shaped element that then functions as a grip, handle or other, it is necessary to make a through hole on one wall of the box-shaped element.

The through hole can be made manually or by means of punching machines, which however are often very complex since they require, for example, means to move the box-shaped element which are able to move the side of the box to be punched into a substantially horizontal position.

Known punching machines also often do not allow the effective elimination of scraps or trimmings resulting from making the through hole, and also they often do not guarantee optimum precision and repeatability in making the through hole.

Known punching machines can therefore be complex, expensive and do not guarantee the precise and repeatable production of at least one through hole on at least one side of a box-shaped element.

There is therefore a need to perfect a punching machine and method that can overcome at least one of the disadvantages of the state of the art.

In particular, one purpose of the present invention is to provide a punching machine for punching a box-shaped element or suchlike which allows to make at least one through hole on at least one side of a box-shaped element in an automatic, precise and repeatable manner, therefore for example for a series of box-shaped elements that arrive at the machine one after the other. The through hole can have any shape and size whatsoever.

Another purpose of the present invention is to provide a punching machine which allows to make a through hole on the box-shaped element without requiring special positioning means for the box-shaped element, without requiring, for example, means that rotate or overturn the box-shaped element, therefore which allows in particular to make a through hole on a vertical side of the box-shaped element.

Another purpose of the present invention is to provide a punching machine which, in addition to allowing a rapid, effective and repetitive production of at least one through hole on at least one side of a box-shaped element, is also able to effectively eliminate the scrap produced by making the through hole.

Another purpose of the present invention is to provide a punching machine which is compact and structurally simple compared with the punching machines known in the state of the art.

Another purpose is to perfect a method to punch a box-shaped element or suchlike which allows to make at least one through hole, of any shape and size whatsoever, automatically, accurately and repeatably, on at least one side of a box-shaped element.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a punching machine according to the present invention comprises at least one punching head provided with at least one punch and translatable in a direction toward or away from a substantially vertical side of the box-shaped element and at least one counter-head that contrasts the punching head. During use, the side of the box-shaped element is positioned between the punching head and the counter-head. The counter-head is configured to be inserted inside the box-shaped element and rest against an internal surface of the side in order to maintain the box-shaped element in position on a work plane. The punching head is translated toward the counter-head in this direction so as to perforate the side by means of the punch and make at least one through hole therein.

Advantageously, by means of the present punching machine it is possible to make at least one through hole on at least one side of a box-shaped element in an automatic, precise and repeatable manner, therefore for example for a series of box-shaped elements that arrive at the machine in succession. The through hole can have any shape and size whatsoever and is made on a substantially vertical side of the box-shaped element, which therefore reaches the zone of the machine where the punching head and the counter-head are positioned already in a position suitable for the punching.

According to another aspect of the invention, the punching head can be mobile in a substantially vertical direction toward or away from the work plane.

The counter-head can be mobile along this substantially vertical direction toward and away from the box-shaped element. The box-shaped element can be provided with an open upper side to allow the entry or exit of the counter-head.

Furthermore, the counter-head can be provided with a piston configured to rest on the bottom of the box-shaped element.

The counter-head can be provided with a tailstock in which the punch is inserted when the punching head makes the through hole in the side of the box-shaped element.

In some embodiments, the present punching machine can comprise one or more centering devices provided with at least one piston configured to translate in one sense or the other in a direction transverse to a direction of advance of the box-shaped element on the work plane. The piston is configured to abut against one side of the box-shaped element directed parallel to the direction of advance.

The work plane can be made on the upper surface of a conveyor belt which automatically moves one or more box-shaped elements toward the punching head.

The machine can also comprise abutment elements configured to abut on a front side of the box-shaped element, and which can be moved by means of suitable actuators toward or away from the work plane, so as to interfere or not interfere with the side.

The machine can also comprise at least one suction device fluidically connected to a chamber made in the counter-head. The suction device is configured to suck from the inside of the chamber a part of the box-shaped element removed as a result of the punching and transfer it to another chamber for collection.

Another purpose of the invention is a method to punch a box-shaped element, or suchlike, comprising: the disposition of a box-shaped element on a work plane so that at least one substantially vertical side of the box-shaped element is positioned resting on a counter-head inserted inside the box-shaped element and configured to provide a contrast to a punching head and maintain the box-shaped element in position on the work plane; the translation of the punching head, provided with at least one punch, toward the side and toward the counter-head; and the perforation of the side by the punch with consequent production of at least one through hole in the side

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the possible embodiments of the invention, of which one or more examples are shown in the attached drawings. Each example is supplied by way of illustration of the invention and shall not be understood as a limitation thereof. For example, one or more characteristics shown or described insomuch as they are part of one embodiment can be varied or adopted on, or in association with, other embodiments to produce another embodiment. It is understood that the present invention shall include all such possible modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
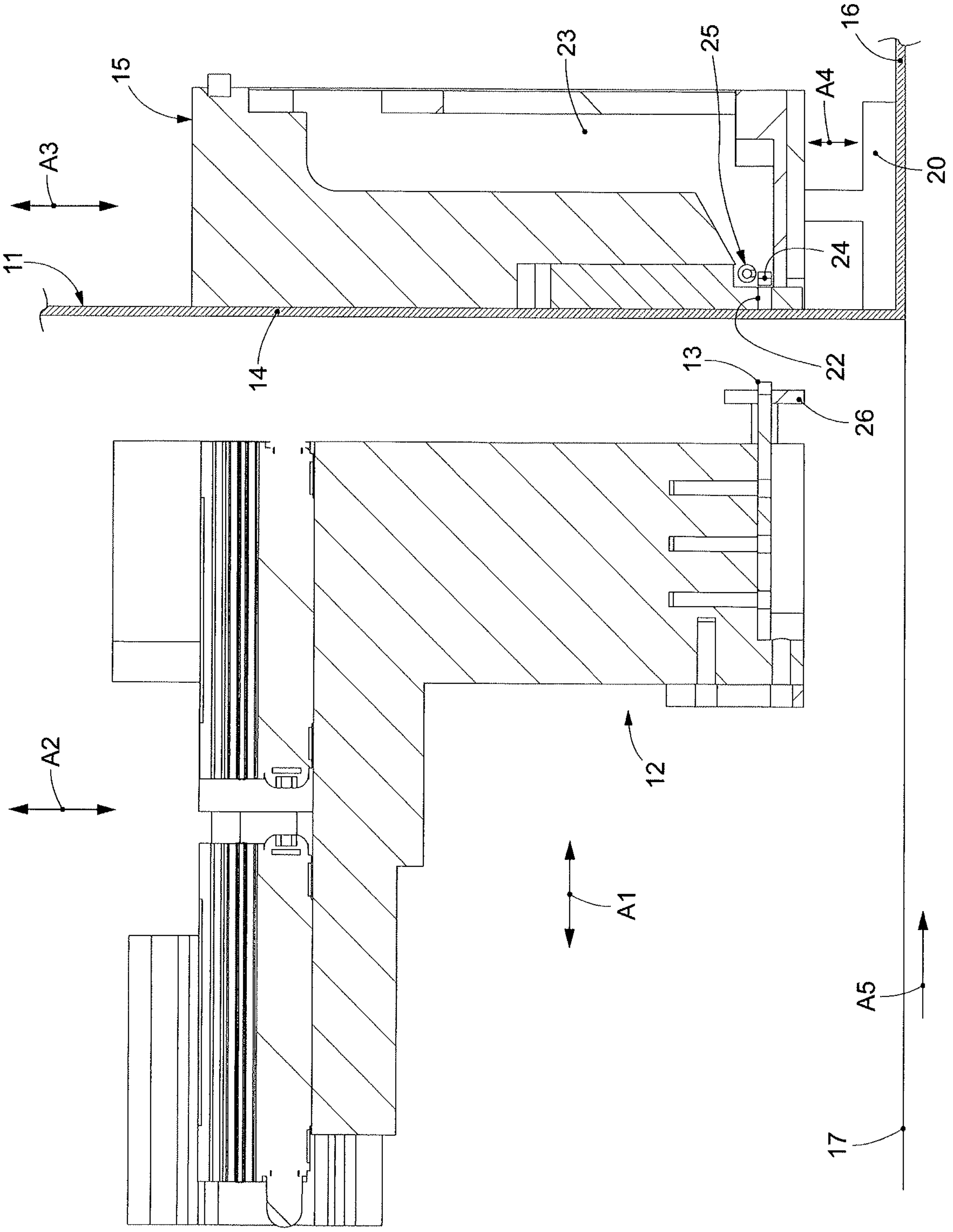
FIG. 1 is a longitudinal section view of a punching head and counter-head of a punching machine according to the present invention.
Figure 2:
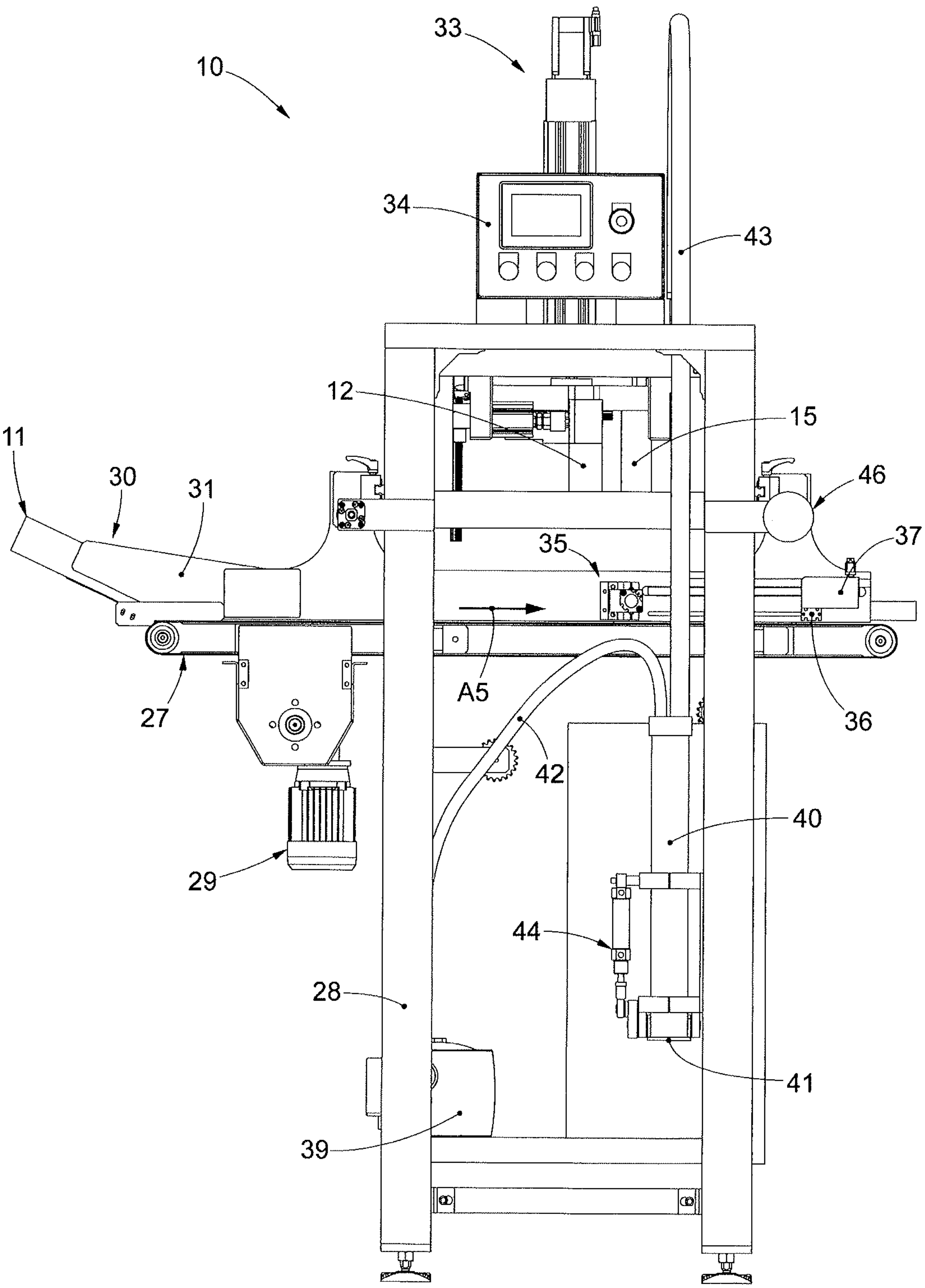
FIG. 2 a lateral view of a punching machine according to the present invention.
Figure 3:
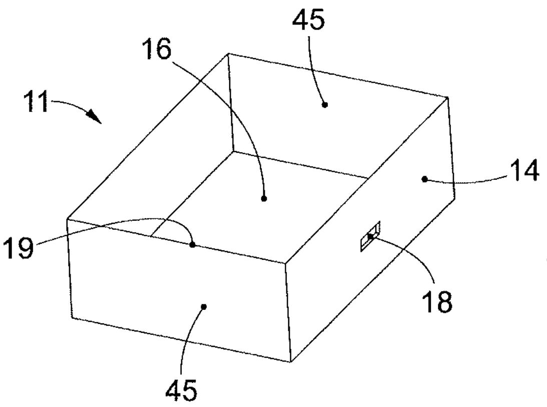
FIG. 3 is a three-dimensional view of a box-shaped element.

With reference to the attached drawings and with particular reference to FIGS. 1, 2 and 3 thereof, a machine 10 for punching a box-shaped element 11 or suchlike comprises at least one punching head 12 provided with at least one punch 13 and translatable in a direction A1 toward or away from a substantially vertical side 14 of the box-shaped element 11 and at least one counter-head 15 that contrasts the punching head 12.

The counter-head 15 is configured to be inserted inside the box-shaped element 11 and rest on an internal surface of the side 14 in order to maintain the box-shaped element 11 in position on a work plane 17.

The side 14 is positioned between the punching head 12 and the counter-head 15 and the punching head 12 is translated toward the counter-head 15 in the direction A1 so as to perforate the side 14 by means of the punch 13 and make at least one through hole 18 therein, see FIG. 3.

The internal surface of the side 14 is therefore in contact with the counter-head 15 while the external surface of the side 14 is suitably distanced from the punching head 12, which is translated in the direction A1 toward the side 14 at the time of punching, so as to perforate the side 14.

The punching head 12 can also be mobile toward or away from the work plane 17 in a direction A2, for example substantially vertical.

The counter-head 15 can be mobile in a direction A3, for example substantially vertical, toward or away from the box-shaped element 11. The box-shaped element 11 can be provided with an open upper side 19, see FIG. 3, to allow the entry or exit of the counter-head 15, which will rest on the bottom 16 of the box-shaped element 11.

In particular, the counter-head 15 can be provided with a piston 20 that rests on the bottom 16. The piston 20 can be mobile with respect to the counter-head 15 in a direction A4, for example a substantially vertical direction toward or away from the bottom 16 of the box-shaped element 11.

The piston 20 comprises a support base that allows to maintain the box-shaped element 11 stationary during the punching operation. Preferably, the counter-head 15 is mechanically constrained to the support of the punching head 12. The piston 20 moves in the direction A3, in particular by falling, and rests on the bottom 16 of the box-shaped element 11. The height at which the through hole 18 is made can be automatically calculated by the control panel 34 after the measurements of the box-shaped element 11 have been entered.

The counter-head 15 is also provided with a tailstock 22, or die, inside which the punch 13 of the punching head 12 is positioned when the punching is carried out.

The tailstock 22 is in fluidic communication with a chamber 23, in particular a suction chamber, in which the part 24 of box-shaped element 11 which is removed from the side 14 in order to create the through hole 18 ends, therefore substantially the scrap part. The complete detachment of the part 24 from the box-shaped element 11 is facilitated by a jet of compressed air which comes out of a blowing device 25 located in the proximity of the tailstock 22. The part 24 can in fact have smears of fresh glue, therefore the blowing device 25 helps to detach the part 24 once the punch 13 has performed the punching.

The punching head 12 is also equipped with an extractor 26, the functioning of which will be explained below when we describe a functioning mode of the machine 10.

The work plane 17 on which the box-shaped element 11 rests can be in particular the upper surface of a conveyor belt 27, see also FIG. 2, which allows to position the box-shaped element 11 in the correct position with respect to the punching head 12 and the counter-head 15. The conveyor belt 27 can move the box-shaped elements 11 resting on it, for example in a direction A5, for example substantially horizontal. The direction A5 is therefore the direction of advance of the box-shaped elements 11 along the machine 10.

The machine 10 can comprise a frame 28 in which the conveyor belt 27 is positioned, see in particular FIG. 2.

The conveyor belt 27 can be driven in the direction A5, or vice versa, for example by means of an electric motor 29 or other suitable drive system.

The box-shaped element 11 enters the machine by means of an inlet section 30 which can be provided with lateral guides 31. The position of the lateral guides 31 present along the machine can be adjusted by means of an adjustment device 46, which substantially adjusts their reciprocal distance so that they adapt perfectly to the width of the box-shaped element 11, see for example FIG. 4*b*.

A drive system 33 can be positioned on the frame 28, configured to allow the lifting and lowering of the punching head 12 and the counter-head 15 in the direction A2. The drive system 33 can be for example a hydraulic, pneumatic or electromechanical actuator, which allows to lift or lower the punching head 12 and the counter-head 15 along a guide, for example a vertical guide. It could also be provided that the head 12 and counter-head 15 are independent and have different drives in direction A2 and in direction A3.

A control panel 34 can be positioned on the frame 28, provided with buttons, a display or other, which allows an operator to manage and control the punching operations.

In a punching zone, the machine 10 can comprise a pair of centering devices 35 configured to allow the correct centering of the box-shaped element 11 in the punching position and able to be positioned in correspondence with opposite lateral walls of the box-shaped element 11, for example the sides 45 of FIG. 3. See also FIGS. 6*b* and 6*c*. The centering devices 35 allow to perfectly adjust the position of the box-shaped element 11 with respect to the punching head 12 and therefore make the through hole 18 precisely. The sides 45 are therefore substantially parallel to the direction A5 of advance of the box-shaped element 11 along the machine 10.

The machine 10 can also comprise abutment elements 36 located at the front part and the longitudinal position of which, that is, the position parallel to the direction A5, can be adjusted by means of a slider 37 configured to translate in one sense or the other parallel to the direction A5.

The machine 10 can also comprise a suction device 39, configured to suck the parts 24 or trimmings detached from the box-shaped element 11 and deriving from the punching, and collect them in a chamber 40. The chamber 40 is provided with a shutter 41, the opening of which allows to discharge the trimmings from the cutting or punching, that is, the scrap parts 24.

The chamber 40 is fluidically connected by means of a first duct 42 to the suction device 39, for example a vacuum pump, and by means of a second duct 43 to the chamber 23 made inside the counter-head 15, see also FIG. 1.

The shutter 41 can be driven to open or close by means of a suitable actuator 44. Downstream of the shutter 41, there can be provided a tank for collecting the trimmings from the cutting or punching.

Advantageously, the box-shaped element 11 reaches the zone where the punching head 12 is positioned from the inlet section 30, performing only a translation in the direction A5, therefore the box-shaped element 11 is already ready for the punching of the substantially vertical side 14, without needing to move the box-shaped element 11 further, that is, without needing to rotate it, overturn it or other.

In order to carry out the punching operations by means of the present machine 10, first of all the measurements of the box-shaped element 11 to be perforated can be set on the control panel 34, and then the positions of the lateral guides 31 and of the abutment elements 36 are set. The setting of the lateral guides 31 and of the abutment elements 36 is preferably carried out manually by an operator.

Figure 4A:
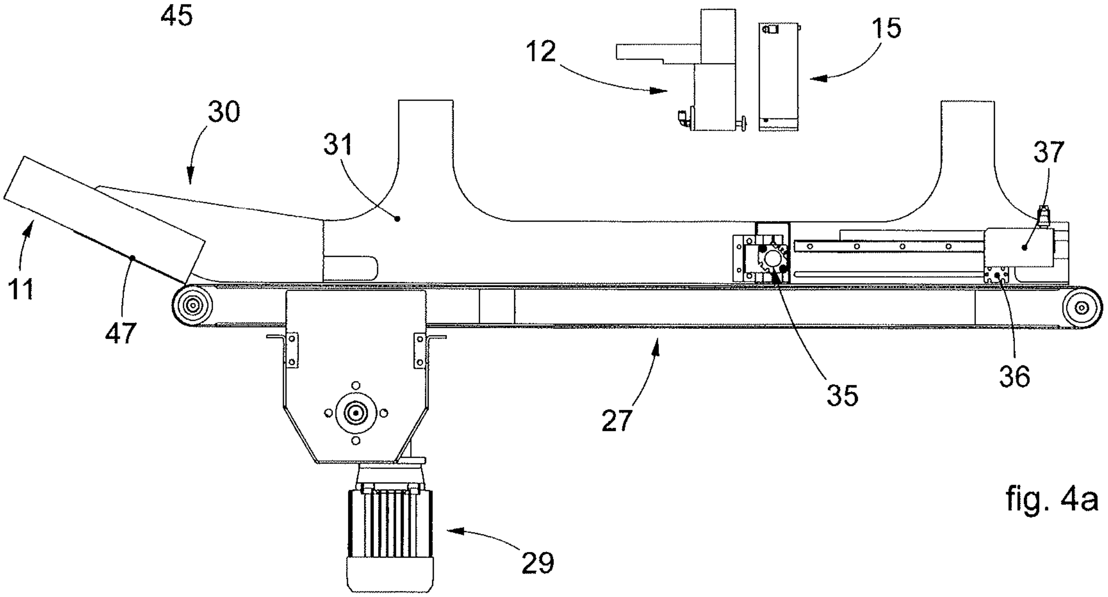
FIGS. 4*a* and 4*b* are respectively a lateral view and a plan view of a step of positioning the box-shaped element.
Figure 4B:
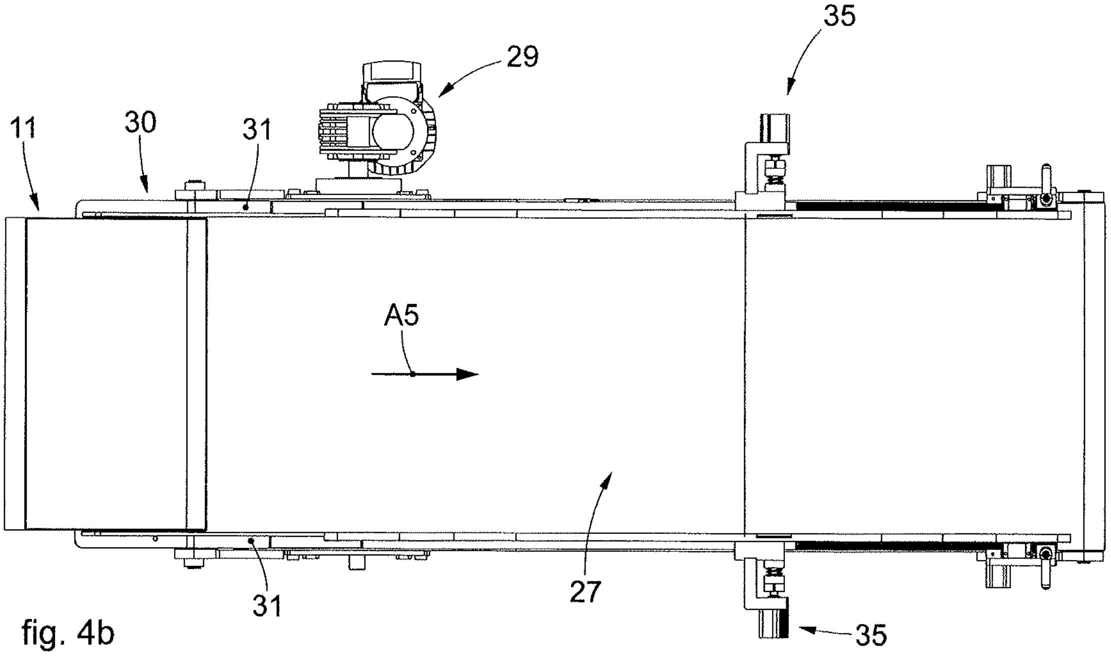

Once the measurements of the box-shaped element 11 have been entered in the control panel 34, a measurement is suggested on a setting page so that the operator, again manually, will displace the abutment elements 36 by means of the slider 37, FIG. 4*a*. There are metric rulers in the proximity of the sliders 37 Alternatively, these settings could be completed by the machine 10 in an automated manner.

The punching head 12 automatically moves to a predetermined height with respect to the upper edge of the box-shaped element 11 or with respect to the conveyor belt 27. The conveyor belt 27 starts moving in the direction A5, see FIGS. 4*a* and 4*b*.

The box-shaped element 11 is deposited manually, or by means of an automatic apparatus, in the inlet section 30 of the machine 10. The inlet section 30 can be provided with an inclined plane 47, having a suitable inclination toward the conveyor belt 27 and able to facilitate the entry operation of the box-shaped element 11.

Figure 5A:
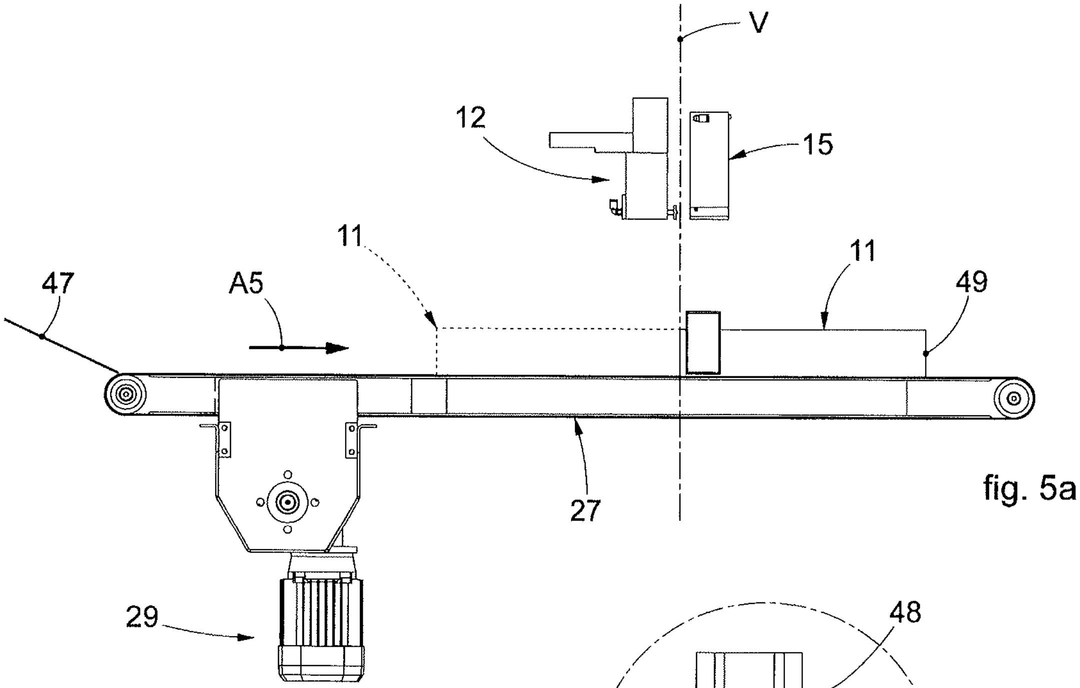
FIGS. 5*a* and 5*b* are respectively a lateral view and a plan view of another step of positioning the box-shaped element.

The conveyor belt 27 drags the box-shaped element 11 in the indicated direction A5. When the box-shaped element 11 intercepts an axis V, see FIG. 5*a*, the abutment elements 36 are translated toward the conveyor belt 27 by means of corresponding actuators 48, so as to create a contrast for the incoming box-shaped element 11.

Figure 5C:
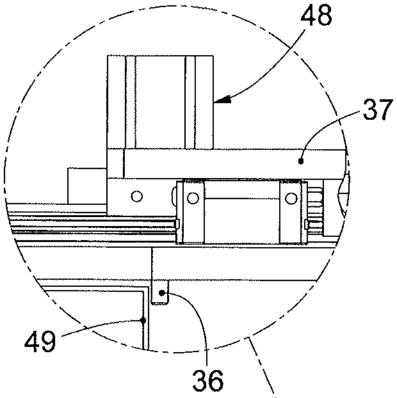
FIG. 5*c* is an enlargement of a detail of FIG. 5*b;*
Figure 5B:
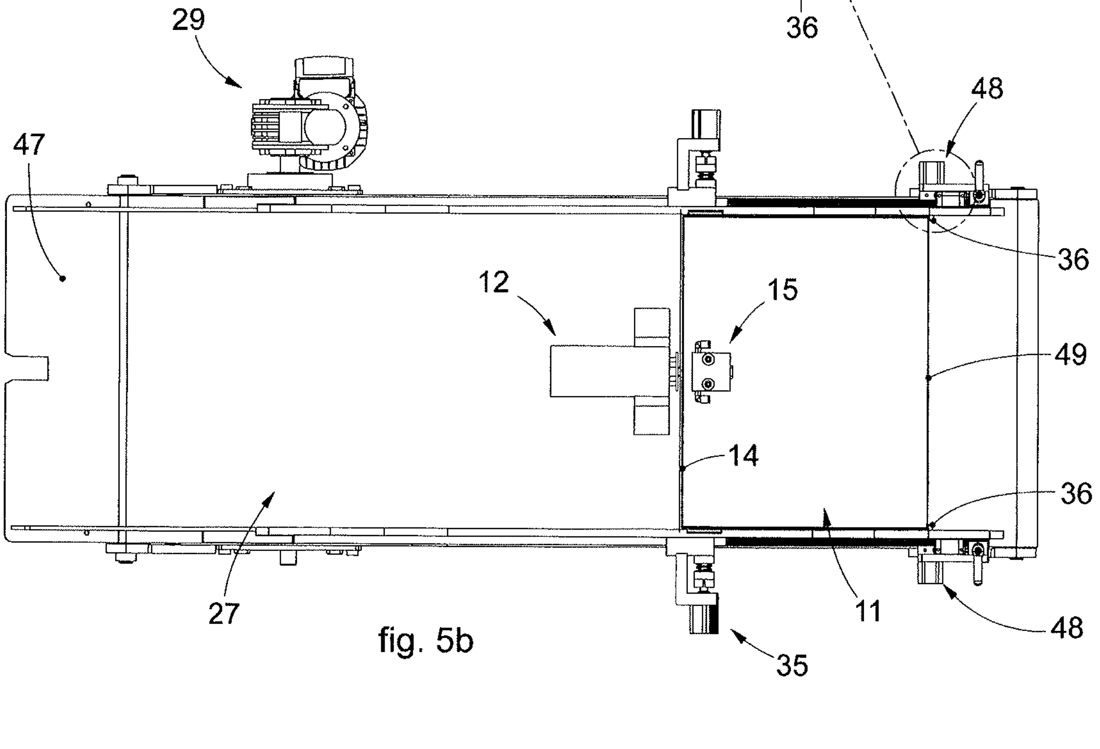

In particular, the front side 49 of the box-shaped element 11 will abut against the abutment elements 36, see also FIGS. 5*b* and 5*c*. The actuators 48 can for example be commanded to determine the exit of the abutment elements 36 by means of a photocell or suchlike, which detects when the box-shaped element 11 arrives in correspondence with the axis V.

The longitudinal position in which to place the abutment elements 36 is determined manually or automatically by means of the control panel 34 which indicates its value based on the sizes of the box-shaped element 11 inserted and the operator will be able to adjust, for example manually, the longitudinal position of the abutment elements 36 with the aid of metric rulers or suchlike.

The box-shaped element 11 then proceeds in direction A5 until it stops, retained by the abutment elements 36. The longitudinal position of the abutment elements 36 is determined in such a way that the part opposite them uncovers the axis V of interception of the box-shaped element 11, or that the box-shaped element 11 goes completely beyond this axis V, see FIGS. 5*a* and 5*b*.

In other words, when the front side 49 of the box-shaped element 11 abuts against the abutment elements 36, the rear side of the box-shaped element 11 will leave the axis V of interception uncovered.

Basically, in an extracted position the abutment elements 36 interfere with the box-shaped element 11, in particular with the front side 49, while in a retracted position the abutment elements 36 do not interfere with the box-shaped element 11.

The interception photocell, where provided, is uncovered and the vertical side 14 of the box is positioned approximately in the center between the punch 12 and counter-head 15.

Figure 6A:
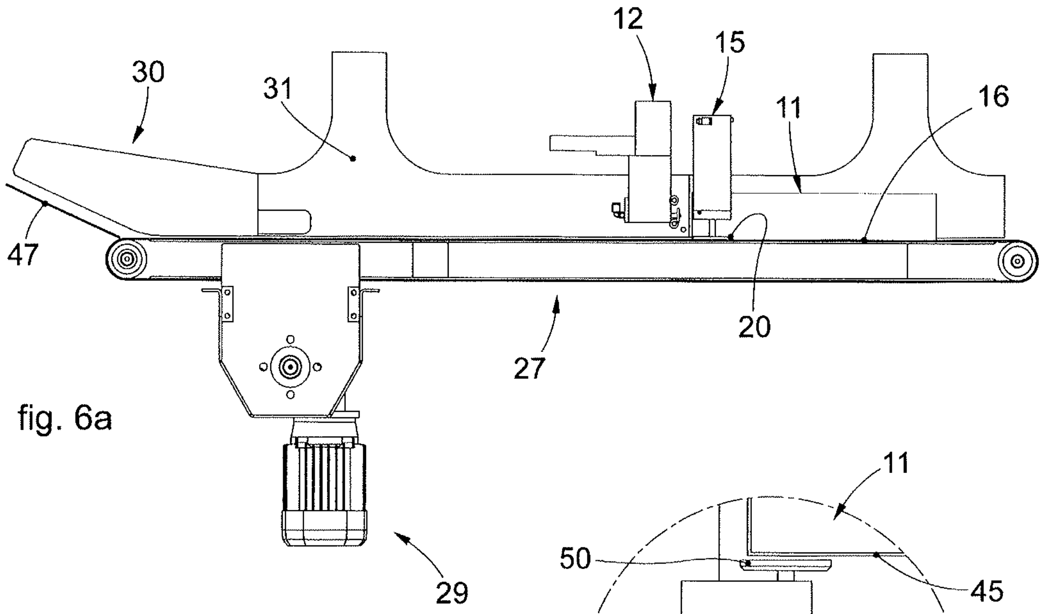
FIGS. 6*a* and 6*b* are respectively a lateral view and a plan view of a final step of positioning the box-shaped element.
Figure 6C:
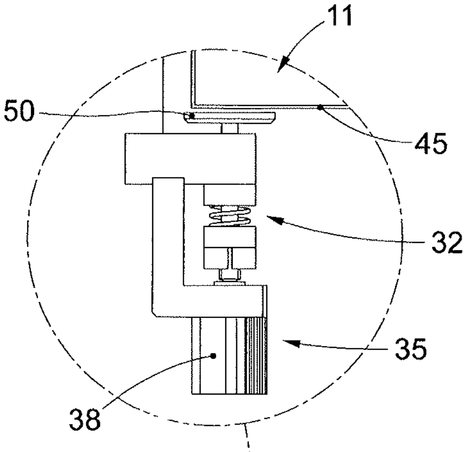
FIG. 6*c* is an enlargement of a detail of FIG. 6*b;*
Figure 6B:
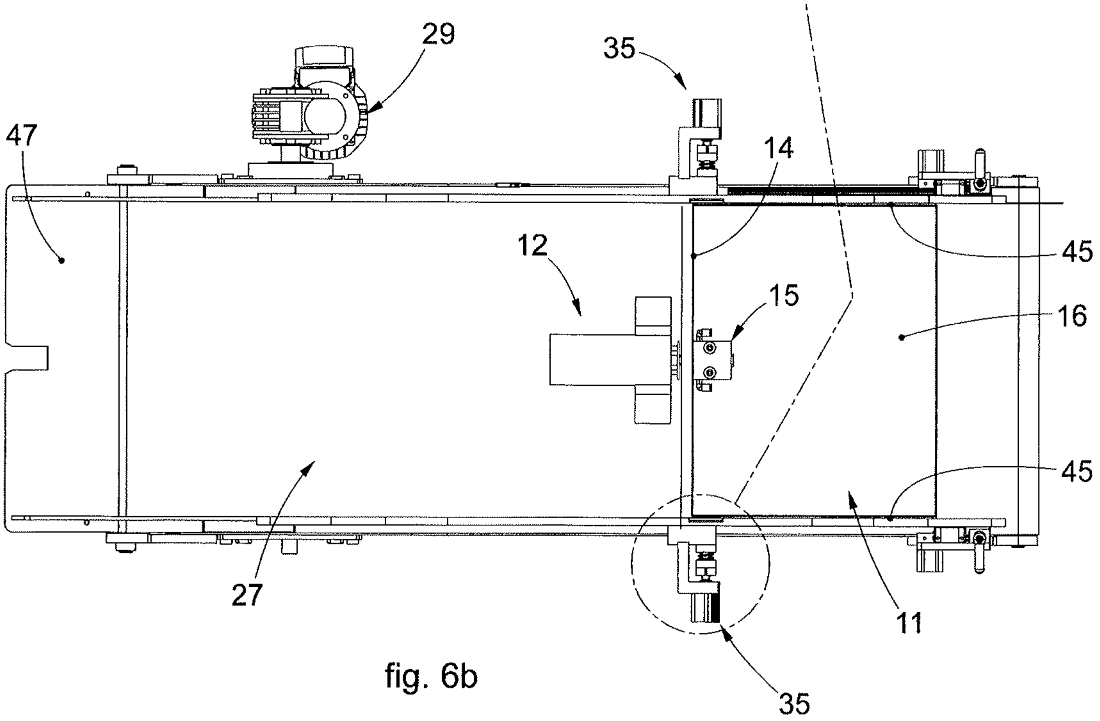

The punching head 12 and the counter-head 15 descend in direction A2 to the punching position determined automatically by the control panel 34, based on the measurements of the box-shaped element 11, and the piston 20 goes to rests on the bottom 16, see FIGS. 6*a* and 6*b*. The through hole 18 can be made at any height whatsoever.

When the punching head 12 reaches the punching position, the abutment elements 36 move back and the internal part of the box-shaped element 11, dragged by the conveyor belt 27, rests on the counter-head 15, in particular the internal surface of the side 14 to be punched rests on the counter-head 15.

At this point, the centering devices 35 come into operation, which comprise, for example, see FIG. 6*c*, a piston 50 the position of which can be adjusted by means of a corresponding actuator 38. The piston 50 of each of the two centering devices 35 allows to perfectly center the box-shaped element 11 in the desired punching position, by acting on the sides 45 of the box-shaped element.

Basically, the pistons 50 of the centering devices 35 move in one sense or the other in a direction transverse to the direction A1 of the punching head 12. These pistons 50 move in one sense or the other also transversely to the direction A5.

The pistons 50 can be associated with elastic means 32 which have the task of allowing the pistons 50 to be retracted. The operator can adjust the incisiveness of the pistons 50 on the sides 45 by positioning the lateral guides 31. The operator, when setting the machine 10, adjusts the lateral guides 31, after having made the pistons 50 advance manually with the suitable key on the control panel 34, so that the box can slide with the minimum play.

At this point, the conveyor belt 27 stops. The box-shaped element 11 and the punching head 12 are in the correct position to perform the punching, see for example the sequence of operations in FIGS. 7*a*, 7*b*, 7*c* and 7*d*.

The punching head 12 is translated in the direction A1 toward the counter-head 15 in order to punch the side 14 of the box-shaped element 11. Once the through hole 18 has been made in the side 14, the punching head 12 is translated in the direction A1 away from the counter-head 15. Then both the punching head 12 and also the counter-head 15 are raised in the direction A2.

Figure 7A:
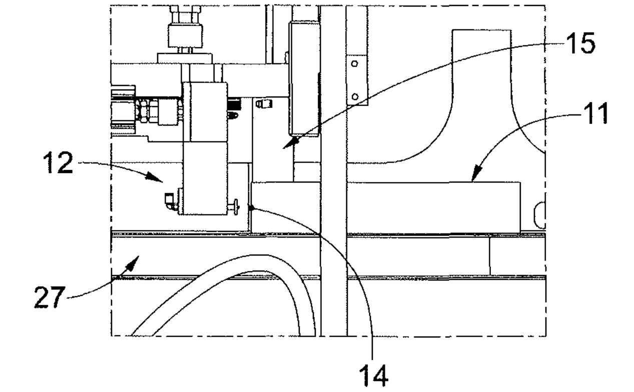
FIGS. 7*a*, 7*b*, 7*c* and 7*d* show, by way of example, a punching sequence.
Figure 7B:
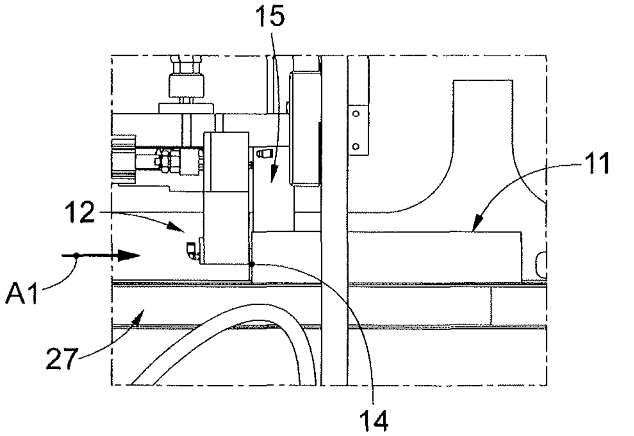
Figure 7C:
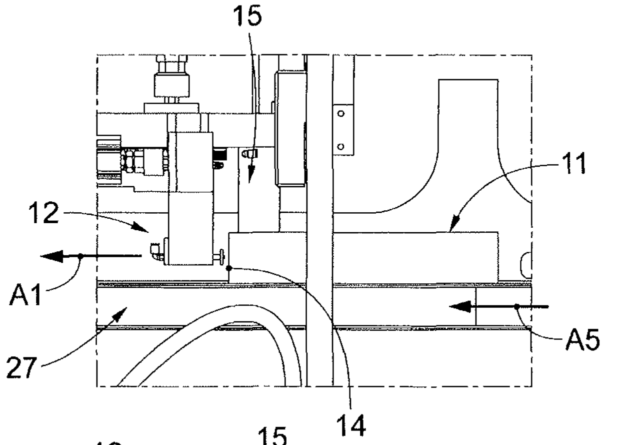
Figure 7D:
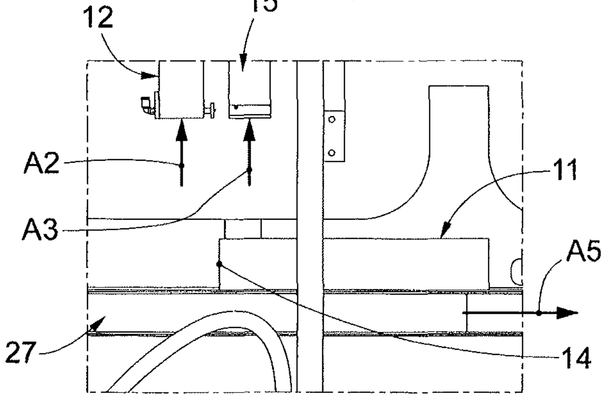
Figure 8:
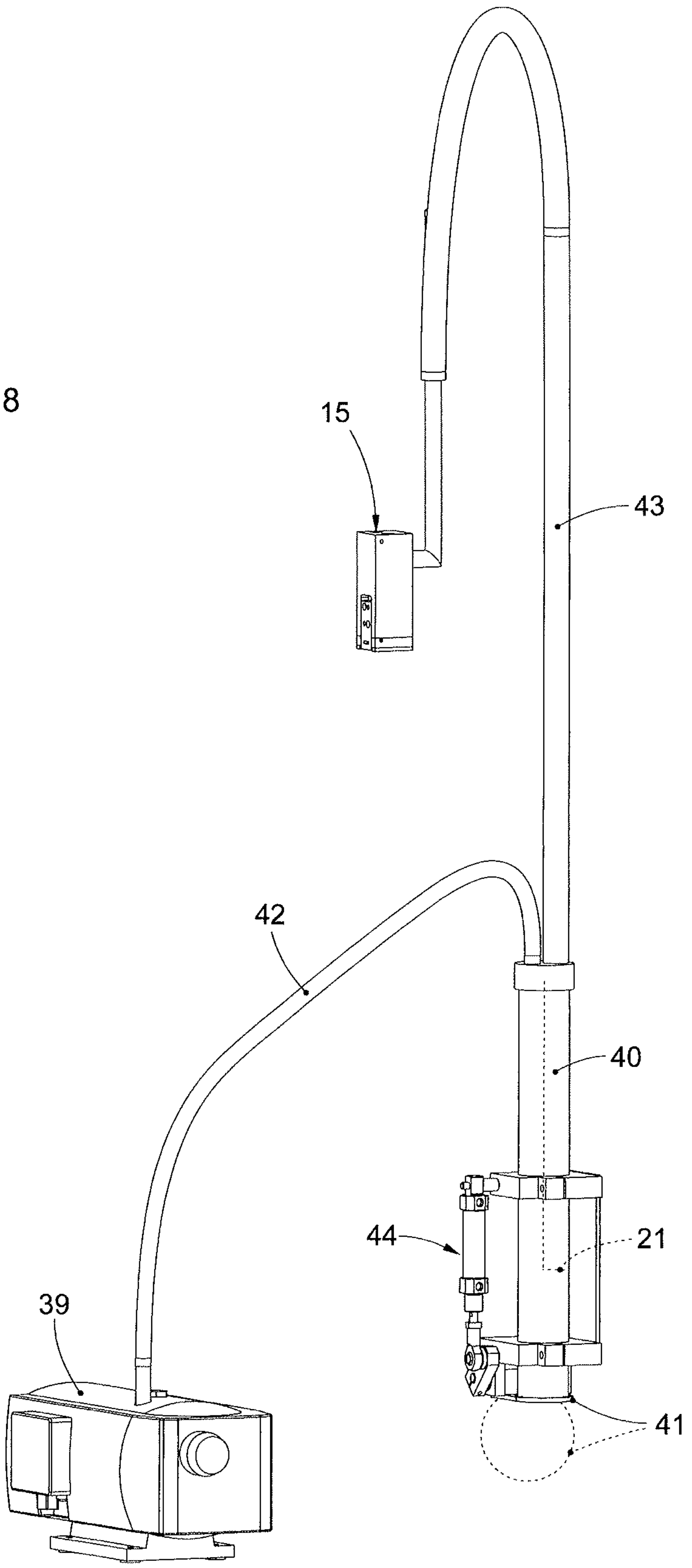
FIG. 8 is a lateral view of a suction device, suitable to eliminate the punching scrap.

Before the step in which the punching head 12 rises, the conveyor belt 27 performs a small backward movement in the direction A5, FIG. 7*c*, so that the side 14 of the box-shaped element 11 does not remain glued to the counter-head 15. Once this small backward movement has been made, the punching head 12 rises to its initial position and the conveyor belt 27 resumes the forward movement in the direction A5, see FIG. 7*d*.

As previously mentioned, see FIG. 1, the punching head 12 is equipped with an extractor 26. The box-shaped element 11 can be made of cardboard with an additional layer of glued paper, therefore the side 14 to be perforated also has glue. The glue, at the time of punching, may not be perfectly dry and therefore may tend to glue the punch 13 to the through hole 18.

In order to prevent the punch 13, during its backward return, from dragging the box-shaped element 11 with it, provision is made for an extractor 26. This extractor 26 comprises a plate that wraps around the punch 13 and is kept in an advanced position by a pair of actuators always under pressure inside the punching head 12.

Substantially, therefore, the extractor 26 can translate forward or backward and therefore toward or away from the side 14, and therefore perform a translation motion with respect to the punch 13.

When the punching head 12 advances to make the through hole 18, the extractor 26 rests on the box-shaped element 11, therefore on the external surface of the side 14, and exerts a pressure on it in the punching zone. There can be a pressure regulator for the extractor 26 in order to find an optimization of the force it produces, so as not to damage the paper of the lining of the box-shaped element 11. During the return of the punching head 12, the extractor 26, since it has a continuous and constant pressure, keeps the box-shaped element 11 stationary on the counter-head 15. In this way, even if there is a certain adhesion between the punch and the box, the box-shaped element 11 is not dragged backward by the punch 13, therefore by the backward movement of the punching head 12. Once the punching head 12 has moved backward completely, neither the punch 13 nor the extractor 26 are in contact with the box-shaped element 11.

As seen, following the punching, trimmings or scrap parts of the box-shaped element 11 are generated, see for example the scrap part 24. The trimming is sucked from the chamber 23 made in the counter-head 15 by means of the suction device 39.

The suction of the trimming essentially presents two problems: the part 24 is normally small and has smears of fresh glue that tend to make it remain attached to the punch 13; furthermore, the part 24 cannot be stored inside the suction chamber 23. After a few scrap parts, the chamber 23 would be full and would no longer allow the operations of the machine 10 to be carried out.

To overcome the first problem, a jet of compressed air is introduced, delivered by means of the blowing device 25, inside the suction chamber 23, in the proximity of the upper part of the punch 13 when this is inside the tailstock 22. The blow produces the detachment of the part 24 from the punch 13 and aids the suction device 39.

The second problem has been solved by taking the parts 24 gradually detached from the box-shaped elements 11 worked in the machine 10 to the outside, precisely by means of the suction device 39.

To prevent the parts 24 from undesirably ending up in the filters of the suction device, for example a vacuum pump, the chamber 40 is placed under vacuum and the duct 43 enters the chamber 40 by a certain depth, see the end 21 of the duct 43 shown with a dashed line. In this way, the parts 24 which are drawn from the counter-head 15 to the duct 43 and therefore to the chamber 40 cannot move back up toward the duct 42, which instead goes from the suction device 39 to the chamber 40 and creates the vacuum in the chamber 40.

The machine 10 can for example be programmed so that when the parts 24 deposited in the chamber 40 reach the end 21 or a slightly lower height, the actuator 44 opens the shutter 41 and allows the scrap parts 24 to be discharged.

It is easy to understand that the punch 13 can have any shape and size whatsoever, as a function of the shape of the through hole 18 to be made, therefore it can have a polygonal shape, for example rectangular, square or other, a circular or elliptical shape or suchlike, or more.

It is clear that modifications and/or additions of parts or steps may be made to the punching machine and method as described heretofore, without departing from the field and scope of the present invention as defined by the claims.

It is also clear that, although the present invention has been described with reference to some specific examples, a person of skill in the art shall certainly be able to achieve many other equivalent forms of punching machine and method, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A machine for punching a box-shaped element (11), wherein it comprises at least one punching head (12) provided with at least one punch (13) and translatable in a direction (A1) toward or away from a substantially vertical side (14) of the box-shaped element (11) and at least one counter-head (15) that contrasts said punching head (12), wherein said side (14) of the box-shaped element (11) is positioned during use between said punching head (12) and said counter-head (15), wherein said counter-head (15) is configured to be inserted inside the box-shaped element (11) and to rest against an internal surface of said side (14) in order to maintain the box-shaped element (11) in position on a work plane (17), and wherein said punching head (12) is translated toward said counter-head (15) in said direction (A1) so as to perforate said side (14) by means of said punch (13) and make at least one through hole (18) therein, wherein said counter-head (15) is provided with a piston (20) configured to rest on a bottom (16) of the box-shaped element (11).

2. The machine as in claim 1, wherein said punching head (12) is mobile in a substantially vertical direction (A2) toward or away from said work plane (17).

3. The machine as in claim 2, wherein said counter-head (15) is mobile in said substantially vertical direction (A2) toward and away from said box-shaped element (11), wherein said box-shaped element (11) is provided with an open upper side (19) to allow the entry or exit of said counter-head (15).

4. The machine as in claim 1, wherein said counter-head (15) is provided with a tailstock (22) in which the punch (13) is inserted when the punching head (12) makes the through hole (18).

5. The machine as in claim 1, wherein it comprises one or more centering devices (35) provided with at least one piston (50) configured to translate in one sense or the other in a direction transverse to a direction (A5) of advance of the box-shaped element (11) on the work plane (17), said piston (50) being configured to abut against a side (45) of the box-shaped element (11) directed parallel to said direction (A5) of advance.

6. The machine as in claim 1, wherein said work plane (17) is made on the upper surface of a conveyor belt (27) which automatically moves one or more box-shaped elements (11) toward said punching head (12).

7. The machine as in claim 1, wherein it comprises abutment elements (36) configured to abut on a front side (49) of the box-shaped element (11) and which can be moved by means of suitable actuators (48) toward or away from the work plane (17), so as to interfere or not interfere with said side (49).

8. The machine as in claim 1, wherein it comprises at least one suction device (39) fluidically connected to a chamber (23) made in said counter-head (15), said suction device (39) being configured to suck from the inside of said chamber (23) a part (24) of the box-shaped element (11) removed as a result of the punching, and transfer it to another chamber (40) for collection.

9. A method to punch a box-shaped element (11), comprising:

disposing a box-shaped element (11) on a work plane (17) so that at least one substantially vertical side (14) of said box-shaped element (11) is positioned resting on a counter-head (15) inserted inside the box-shaped element (11) and configured to provide a contrast to a punching head (12) and maintain said box-shaped element (11) in position on said work plane (17);

translating said punching head (12) provided with at least one punch (13) toward said side (14) and toward said counter-head (15); and perforating said side (14) by said punch (13) with consequent production of at least one through hole (18) in said side (14), wherein said counter-head (15) is provided with a piston (20) configured to rest on a bottom (16) of the box-shaped element (11).

* * * * *